July 15, 1941.  A. E. LADEWIG  2,249,614
BOTTLE WASHER STOP
Filed Feb. 5, 1940  2 Sheets-Sheet 1
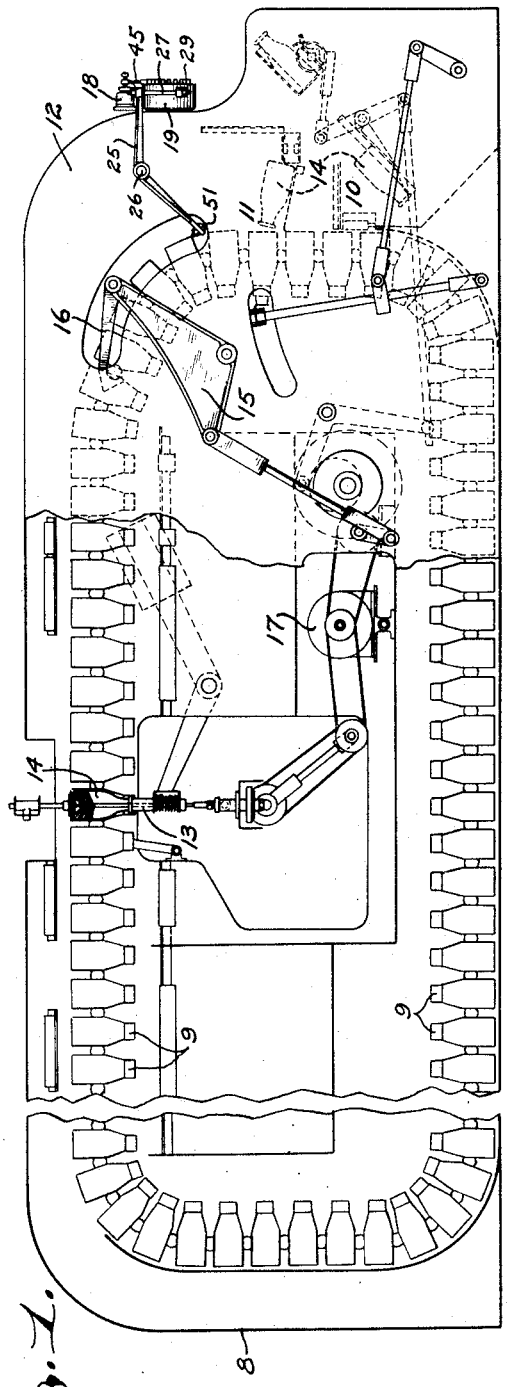
Fig. 1.
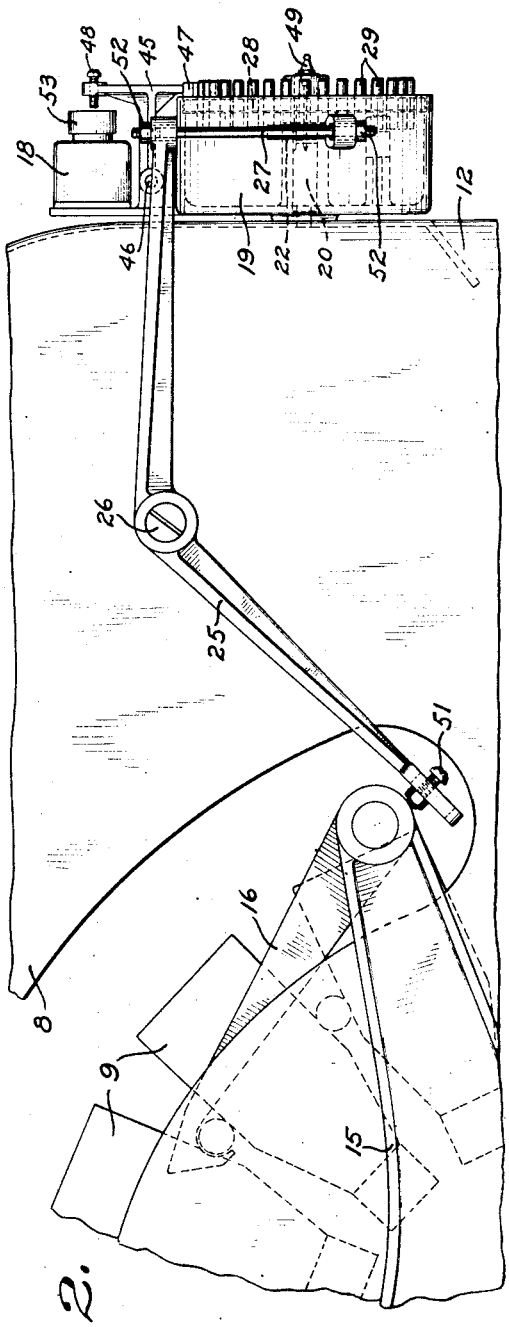
Fig. 2.
INVENTOR
A. E. Ladewig
BY
Morsell, Lieber & Morsell
ATTORNEYS.

July 15, 1941.　　　A. E. LADEWIG　　　2,249,614
BOTTLE WASHER STOP
Filed Feb. 5, 1940　　　2 Sheets-Sheet 2
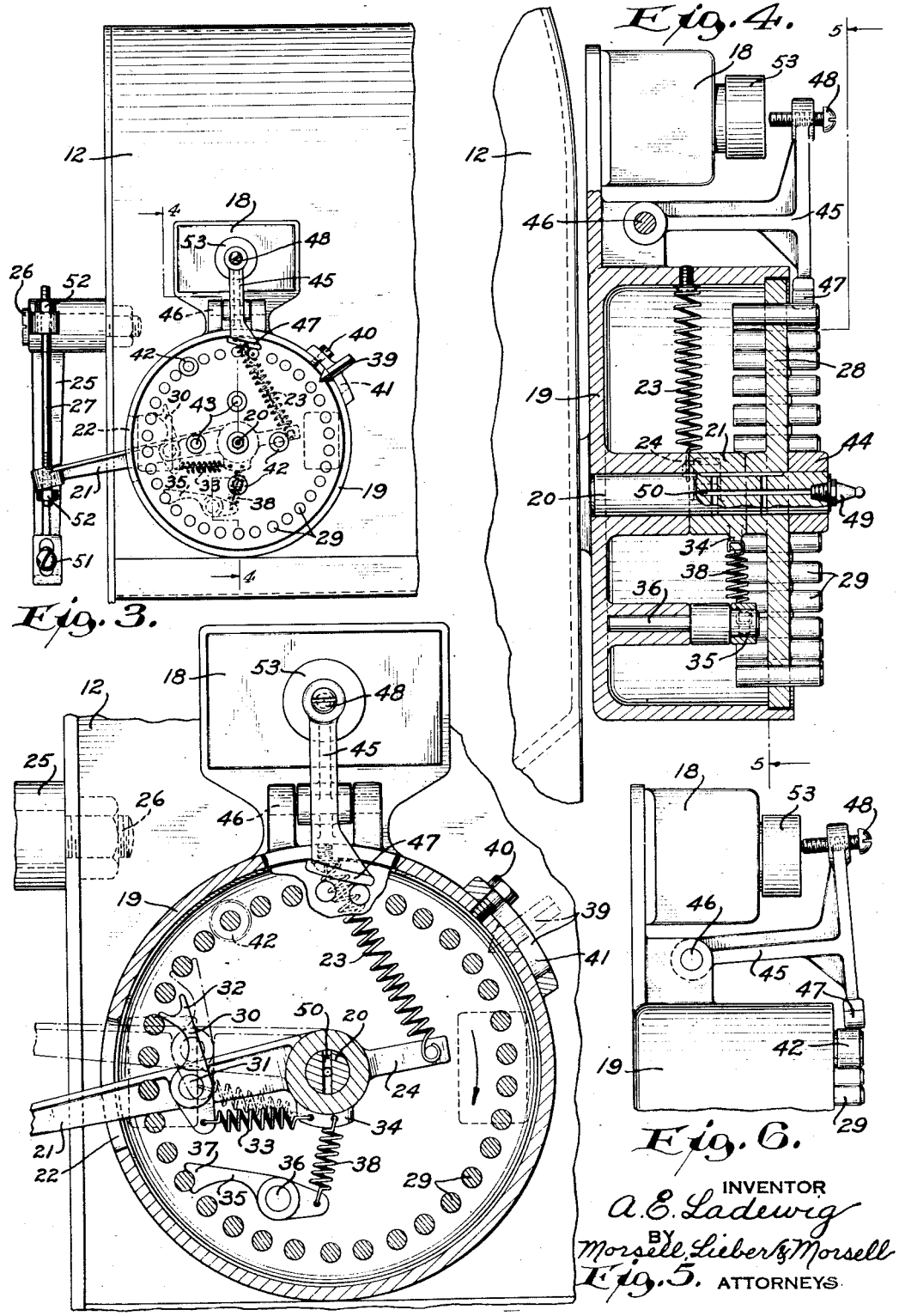

Patented July 15, 1941

2,249,614

UNITED STATES PATENT OFFICE 2,249,614

BOTTLE WASHER STOP

Archie E. Ladewig, Waukesha, Wis.

Application February 5, 1940, Serial No. 317,242

4 Claims. (Cl. 141—7)

The present invention relates generally to improvements in mechanisms for controlling machines under certain predetermined conditions, and relates more specifically to improvements in the construction and operation of automatic indicating devices for bottle washers or the like.

Generally defined, an object of the present invention is to provide improved mechanism for automatically arresting the operation of a machine in order to permit readjustment of working parts so as to conform with the new conditions of operation.

In certain industries, such as the canning, brewing and dairy industries, it is common commercial practice to utilize automatic machines for the purpose of washing, filling or otherwise treating a succession of containers, such as glass bottles. Some of these automatic machines, and especially the bottle washers, are adapted to handle containers of different shapes and sizes, but when the operation is changed from one kind of bottles to another, as from large to small bottles and vice versa, it frequently becomes necessary to make various adjustments of parts of the mechanism in order to insure most effective operation and to avoid possible damage to the machine and breakage of bottles. The adjustable parts such as nozzles or brushes, are ordinarily located within the machine housing remote from the container loading and unloading zones, and while the required adjustments cannot be made without considerable waste of time when the different size bottles are initially admitted to the washing machine, the bottle transporting mechanism must be stopped before these new sized bottles reach the parts requiring adjustment and the adjustments can be made. In the past it has been necessary for the operator to carefully count the number of certain size bottles which he admitted to the machine in order that he might determine when the first of this particular size would approach the adjustable parts so that he could stop the washer for the desired adjustments. Because of the inability of most operators to maintain accurate account of the exact number of bottles or rows of bottles admitted, it was general practice to avoid admitting new bottles to four or five rows of transporting pockets when changing from one size to another, and this procedure not only resulted in loss of considerable time, but quite frequently the new sized bottles would also reach the actual zone of the adjustable parts before adjustment had been effected, and serious damage would be caused to the machine parts and bottles would be broken.

It is therefore a more specific object of my present invention to provide an improved indexing device which may be conveniently set whenever the sizes or shapes of the containers admitted to a machine are changed, and which will automatically stop the machine for adjustment when the new sized or shaped containers reach a predetermined point in advance of the adjusting zone.

Another specific object of the present invention is to provide an improved automatic stop for bottle washing machines or the like, which may be pre-set by the operator at the loading zone whenever the size of the admitted bottles is changed so as to require adjustment of machine parts, and which will function to positively avoid possible damaging of machine parts and breakage of bottles.

A further specific object of this invention is to provide a new and useful bottle washer stop assemblage which is simple and compact in construction, readily manipulable, and which will positively stop the machine at any predetermined moment.

Still another specific object of the invention is to provide an improved automatic stop for diverse machines wherein periodic stoppage for adjustment is necessary, and which can be applied to such machines without interfering with their normal operation and at moderate cost.

These and other specific objects and advantages of the present invention will be apparent from the following detailed description.

A clear conception of an embodiment of the invention as applied to a milk bottle washing machine, may be had by referring to the drawings accompanying and forming a part of this specification, wherein like reference characters designate the same or similar parts in the various views.

Fig. 1 is a somewhat diagrammatic part sectional side elevation of a milk bottle washing machine equipped with the improved stop mechanism;

Fig. 2 is an enlarged fragmentary side view of the upper front portion of the machine of Fig. 1, showing the improved automatic stop mechanism applied thereto;

Fig. 3 is a front view of the machine portion and stop mechanism of Fig. 2;

Fig. 4 is an enlarged vertical section through the improved automatic stop mechanism, taken along the irregular line 4—4 of Fig. 3;

Fig. 5 is a similarly enlarged transverse vertical section through the improved stop mechanism, taken along the irregular line 5—5 of Fig. 4; and Fig. 6 is a likewise enlarged side view of the stop switch assemblage, showing the switch cutout in active position.

Although the invention has been shown and described herein as being especially applicable to milk bottle washing machines having adjustable nozzles which must be adjusted to cooperate effectively with various sizes of inverted bottles, it is not the intent to thereby unnecessarily limit the scope or utility of the improvement which may obviously be applied to other than bottle washing assemblages.

Referring to the drawings, the improved bottle washer stop mechanism disclosed therein is especially adapted for operation in conjunction with a bottle washing machine of the type shown diagrammatically in Fig. 1, and this machine comprises in general a main casing or housing 8; a continuous series of bottle carrier pockets 9 intermittently movable along guide rails within the housing 8; a dirty bottle loading zone 10 and a clean bottle discharge zone 11 located at the same or front end 12 of the housing 8; diverse means such as adjustable spray injecting and brushing nozzles 13 confined within the housing 8 and being cooperable with the bottles 14 to cleanse the same; an oscillatory arm 15 and pawl 16 cooperable with the carrier pockets 9 to intermittently advance the same within the housing 8; an electric motor 17 for oscillating the arm 15 and for actuating the nozzles 13 and other movable parts of the machine; and a control switch 18 for the motor 17, preferably located near the operator's station at the front end 12 of the housing 8.

This type of bottle washing machine is well known in the art, and the carrier pockets 9 are ordinarily arranged in transverse rows and the number of rows and of pockets in each row, may be varied to suit desired conditions of operation. The nozzles 13 which are confined within the housing 8 and are cooperable with the bottles 14 carried by the pockets 9, are adapted to enter the inverted bottles while at rest in order to cleanse the interiors thereof, and these nozzles 13 must be adjusted as to stroke of travel and while the machine is stopped, when operating on bottles 14 of different sizes. Since most of the pockets 9 contain bottles 14, it is preferable to stop the machine and to make the required adjustment of the nozzles 13 whenever the last bottles 14 of one size have been acted upon by the nozzles, and the first of the different size bottles are about to be acted upon. The improved automatic stop mechanism constituting the present invention, is adapted to be set whenever the first bottles 14 of the new size are admitted to the washer at the loading zone 10, and functions to throw the switch 18 and to stop the motor 17 when these first bottles of the new size reach a position directly in advance of the nozzles 13.

Referring more specifically to Figs. 2 to 6 inclusive, the new bottle washer stop illustrated therein, comprises in general a casing 19 adapted for attachment to the front end 12 of the housing 8 within convenient reach of the operator and providing a support for the switch 18; a stub shaft 20 fixedly mounted centrally within the casing 19 and extending forwardly beyond the front of the casing; a pawl actuating lever 21 swingably suspended upon the medial portion of the shaft 20 and projecting laterally through a side slot 22 in the casing 19; a tension spring 23 coacting with a rigid extension 24 on the lever 21 and with the interior of the casing 19 so as to constantly urge the lever 21 in one direction about the shaft 20; a bell crank lever 25 mounted on a pivot 26 secured to the casing 8, and having one arm cooperable with the swinging end of the pocket moving arm 15, while its other arm is connected to the swinging end of the pawl lever 21 by means of an adjustable connection 27; a disk 28 journalled on the fixed shaft 20 adjacent to the lever 21 and having an annular series of parallel pins 29 secured thereto and extending therethrough; a pin engaging and moving pawl 30 pivotally suspended from the medial portion of the lever 21 by a pivot pin 31 and having a forked end 32 engageable with the successive pins 29 while its opposite end is connected by means of a tension spring 33 to a hub flange 34 formed integral with the lever 21; a disk holding pawl 35 swingably suspended within the casing 19 upon a fixed pivot pin 36 and having a forked pin engaging end 37, while its opposite end is also connected to the hub flange 34 by means of a tension spring 38; an indicating pointer 39 adjustably secured to the periphery of the casing 19 by means of a bolt 40 coacting with a slot 41, the pointer 39 being directed radially of the shaft 20 and toward the pins 29; a plurality of collars 42 adapted to be suspended when not in use, upon carrier pins 43 secured to the disk 28, and also adapted to be snugly positioned upon selected pins 29; a nut 44 coacting with the threaded outer extremity of the shaft 20 to retain the disk 28 and lever 21 in position; and a switch actuating lever 45 swingably suspended from the casing 19 by means of a pivot pin 46, and having a collar contacting shoe 47 disposed near the path of travel of the pins 29, the lever 45 also having an adjustable set screw 48 which is adapted to throw the switch 18 and stop the motor 17 under certain conditions of operation.

The fixed journal shaft 20 may be provided with a lubricating fitting 49 and internal passages 50 as shown in Figs. 4 and 5, for the purpose of effecting lubrication of the bearings for the lever 21 and disk 28; and the end of the bell crank lever 25 which coacts with the pawl arm 15, is provided with an adjustable contact screw 51 which insures proper oscillation of the bell crank so as to cause the pawl 30 to advance the pins 29 by successive steps of definite length. The connecting rod 27 is also adjustable by means of nuts 52 at the threaded ends thereof and which coact with the levers 21, 25 respectively so as to insure proper operation; and the spring 23 constantly tends to swing the lever 21 downwardly and the free end of the bell crank 25 upwardly, while the springs 33, 38 constantly urge the forked ends of their respective pawls 30, 35 outwardly toward the pins 29. The bolt or screw 40 serves to permit proper adjustment of the pointer 39 relative to the pins 29, and the set screw 48 carried by the lever 45 is normally out of contact with the switch actuating plunger 53 but is cooperable with this plunger whenever a collar 42 engages the lever shoe 47 and swings the lever 45 as in Fig. 6. The switch 18 may be of any desired type, and is closed when positioned as in Fig. 4, being open when positioned as in Fig. 6. The number of pins 29 in the annular series, counting from the pointer 39 to the lever shoe 47, should be equal to the number of cycles of operation performed by the bottle washing machine from the loading zone 10 to a point directly in advance of the adjustable nozzles 13, so that a pin 42 which is disposed directly adjacent the pointer 39 will travel to a point directly adjacent to the shoe 47, when a bottle admitted to a pocket 9 at the loading zone has traveled to a point directly in advance of the nozzles 13.

During normal operation of the improved automatic stop mechanism and assuming the bottle washing machine to be operating, the motor 17 is functioning to periodically advance the successive bottle carrier pockets 9 along the circuitous path, and is also functioning to operate the nozzles 13 and the loading and unloading mechanisms. Whenever the lever arm 15 is swung forwardly, the swinging end thereof engages the set screw 51 and swings the bell crank lever 25 about its pivot 26, thereby causing the lever 21 to swing upwardly and to advance the disk 28 a distance equal to the distance between adjacent pins 29. When no collar 42 has been applied to any of the pins 29, these pins will revolve past the shoe 47 without affecting the position of the switch actuating lever 45. However, when it becomes desirable to change the size of the bottles 14 which are to be washed, then the operator should apply one of the collars 42 to the pin 29 which is directly adjacent to the pointer 39 when the first bottles of the new size are admitted to the pockets 9 at the loading zone 10. As the admission of the new size bottles 14 continues, and these bottles are carried through the machine by the oscillating lever 15 and pawl 16, the pin upon which the collar 42 has been placed advances about the fixed shaft 20 and gradually approaches the shoe 47 of the lever 45. When the collar 42 reaches the zone of the lever 45, it engages the shoe 47 and swings the lever from the position shown in Fig. 4 to the position shown in Fig. 6, thereby opening the switch 18 and stopping the motor 17. The first of the new sized bottles will then have reached a position directly in advance of the nozzles 13, and while the machine is thus stopped the operator can effect adjustment of the nozzles 13 for proper cooperation with the new sized bottles.

As a more specific example of the operation of the improved device, an operator might be operating the machine on quart size bottles 14 and he may have inserted ten rows of these quart size bottles in the machine, at which point he desires to change the operation to pint size bottles 14. When he admits the first row of pint size bottles into the machine he should take a bushing 42 and place it over the pin 29 which is located directly adjacent to the arrow 29 at the time that the first pint size bottles are admitted. When the first of these pint size bottles reaches a position directly in advance of the nozzles 13, the machine will stop. The operator may only desire to insert five or six rows of pint size bottles, after which it may be desirable to again insert quart size bottles. This may be done before the machine has stopped for the purpose of making the first adjustment. When the operator desires to again switch to quart size bottles, he should take another bushing 42 and apply it to the pin 29 adjacent the pointer 39 when the change is made to quart size bottles. The machine will then stop several times during one complete cycle of travel of the pockets 9, and the operator will make his adjustment of the nozzles 13 during each stop period.

The pawl 30 will obviously advance the disk 28 during each oscillation of the lever 21, by an amount equal to the distance between adjacent pins 29, and the pawl 35 merely serves to prevent reverse displacement of the disk 28. The automatic stop is obviously applicable to any bottle washing machine regardless of the distance through which the pocket conveyer is moved during each oscillation of the lever 15, but the cycles of operation of the lever 15 and pawl 16 must correspond to the distances between the successive pins 29. When the operator makes an adjustment of the nozzle 13 following stoppage of the motor 17 by the switch 18, he should remove the bushing 42 which has caused the machine stoppage, and the extra bushings may be applied to the pins 43 where they will be readily available for future use. The changing of sizes of containers may be effected as frequently as desired, and in order to restart the machine, the switch button 53 must be restored to the position in Fig. 4, and this fact compels the operator to remove the collars 42 from the adjacent pins 29 which are nearest the shoe 47.

From the foregoing detailed description it will be apparent that my present invention provides a simple, compact and automatically functioning mechanism for stopping a bottle washing machine or the like at any desired time, and for the purpose of making any desired adjustment. There may be several adjustments to be made during a single cycle of travel of the pockets 9, and the machine can be readily stopped for each of these adjustments by merely adding additional collars 42 to selected pins 29. The device can obviously be used on any machine having characteristics similar to those of the bottle washing machine herein shown and described, and the objects operated upon need not be bottles. The improved stopping mechanism is positive and fool-proof in action and eliminates delay and waste of time due to improper stoppage of the machine and due to omission of bottles from numerous pockets preceding the point of adjustment. The improved stop mechanism furthermore is reliable in action and can be readily adjusted to suit various operating conditions. The stop assemblage shown and described herein has proven highly successful in actual commercial use in connection with bottle washing machines, and can be manufactured and sold at moderate cost, while also being readily applicable to standard washers.

It should be understood that it is not desired to limit this invention to the exact details of construction or to the precise mode of operation, herein shown and described, and various modifications within the scope of the claims may occur to persons skilled in the art.

I claim:

1. In combination, an article conveyor having a loading zone and adjustable devices cooperable with articles transported by said conveyor when said articles are remote from said zone, means for intermittently advancing said conveyor, a lever controlling operation of said conveyor advancing means, a series of fixed pins intermittently revolvable about an axis by said conveyor advancing means, and elements removably associable with selected pins of said series for operative successive engagement with said lever for stopping the movement of said conveyor at predetermined future intervals.

2. In combination, an article conveyor having a loading zone and adjustable devices cooperable with articles transported by said conveyor when said articles are remote from said zone, means for intermittently advancing said conveyor, a lever controlling operation of said conveyor advancing means, a series of fixed pins intermittently revolvable about an axis by said conveyor advancing means, and collars adapted to be removably applied to certain of said pins when certain articles are admitted to said loading zone, said collars being active to ultimately operatively engage said lever to positively stop the advancement of said conveyor when said certain articles reach a position directly in advance of said adjustable devices.

3. In combination, an endless bottle conveyor having a loading zone, an adjustable nozzle cooperable with bottles carried by said conveyor remote from said zone, mechanism for intermittently advancing said conveyor, a movable lever controlling operation of said conveyor advancing means, an annular series of fixed pins revolvable about an axis by said mechanism, said pins being movable about said axis by steps corresponding to the step of advancement of said conveyor by said mechanism, and collars interchangeably cooperable with selected pins of said series and ultimately engageable with said lever to move it for positively stopping said conveyor when selected bottles approach said nozzle.

4. In combination, an endless bottle conveyor having a loading zone, an adjustable nozzle cooperable with bottles carried by said conveyor remote from said zone, mechanism for intermittently advancing said conveyor, a movably mounted lever controlling operation of said conveyor advancing means, an annular series of fixed pins revolvable about an axis by said mechanism, said pins being movable about said axis by steps corresponding to the steps of advancement of said conveyor by said mechanism, and a removable collar cooperable with a selected pin of said series for positively stopping the conveyor advancing mechanism by ultimately contacting and moving said lever, said collar being applicable to the selected pin considerably in advance of the actual stopping of the conveyor.

ARCHIE E. LADEWIG.